United States Patent [19]

Nakata et al.

[11] 4,072,734
[45] Feb. 7, 1978

[54] CURED OR UNCURED COMPOSITIONS OF HOMOPOLYMERS AND COPOLYMERS OF EPIHALOHYDRINS

[75] Inventors: Tetsuya Nakata, Ibaragi; Nobuo Yamada, Amagasaki; Akira Hashimoto, Itami; Yasuto Takata; Yukinari Bunnomori, both of Amagasaki, all of Japan

[73] Assignee: Osaka Soda Co. Ltd., Osaka, Japan

[21] Appl. No.: 612,759

[22] Filed: Sept. 12, 1975

[30] Foreign Application Priority Data

Aug. 6, 1975  Japan ................... 50-96203

[51] Int. Cl.² ............................................. C08G 65/32
[52] U.S. Cl. ..................... 260/873; 260/2 A; 260/18 EP; 260/24; 260/27 R; 260/78.3 R; 260/78.41; 260/47 EP; 260/890; 260/897 C; 260/899; 260/901
[58] Field of Search ............ 260/2 A, 18 EP, 24, 260/27 R, 78.4 EP, 78.4 D, 47 EP, 873, 890, 897 C, 899, 901, 78.3 R, 78.41

[56] References Cited
U.S. PATENT DOCUMENTS

| 3,026,270 | 3/1962 | Robinson ................... 260/2 |
| 3,341,491 | 9/1967 | Robinson et al. ............ 260/45.75 |
| 3,414,529 | 12/1968 | Green et al. ................ 260/2 |
| 3,726,841 | 4/1973 | Mirolli et al. ............... 260/79 |
| 3,790,506 | 2/1974 | Tillson ...................... 260/2 A |
| 3,790,524 | 2/1974 | Saito et al. ................. 260/45.8 N |
| 3,875,122 | 4/1975 | Mirolli ...................... 260/78.4 D |

Primary Examiner—Harold D. Anderson
Assistant Examiner—E. A. Nielsen
Attorney, Agent, or Firm—Sherman & Shalloway

[57] ABSTRACT

A cured or uncured composition of a homopolymer or copolymer of an epihalohydrin comprising a homopolymer or copolymer of an epihalohydrin, a curing amount of a curing agent therefor and an acid acceptor, characterized in that the curing agent and acid acceptor are free from a cyclic carboxylic acid anhydride and consist, based on 100 parts by weight of the epihalohydrin homopolymer or copolymer, of a. a component selected from the group consisting of 1 to 200 parts by weight of an acid salt of 1 mole of a polybasic carboxylic acid with 1 mole of 1,8-diazabicyclo(5,4,0)undecene-7 and a mixture of 1 to 200 parts by weight of a polybasic carboxylic acid and 1 to 10 parts by weight of a neutral salt of 1,8-diazabicyclo(5,4,0)undecene-7, and b. 1 to 20 parts by weight of a specific metal compound of Group II and Group IVa of the periodic table of elements.

21 Claims, 3 Drawing Figures

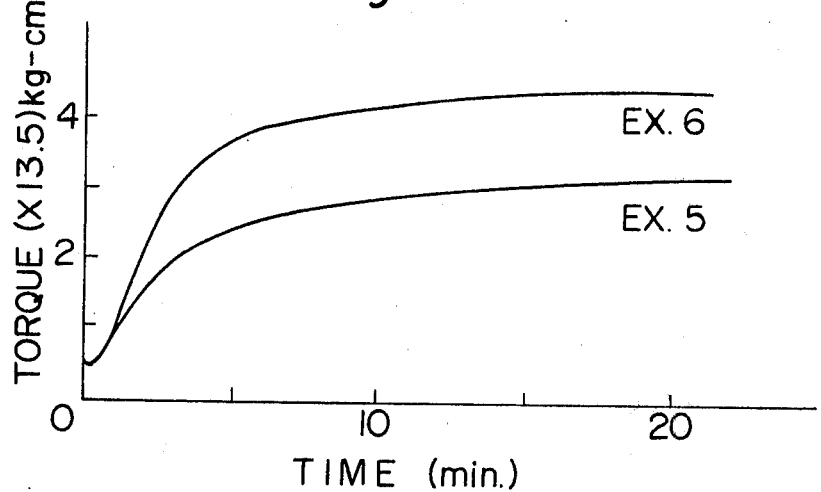
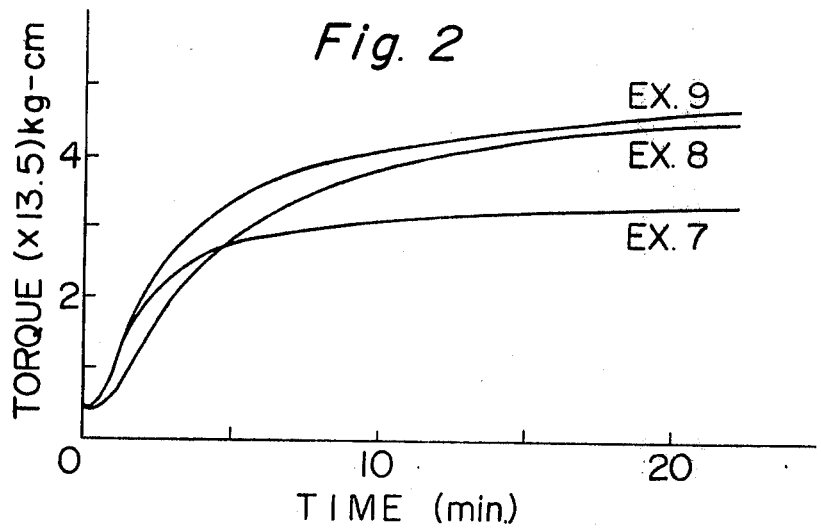

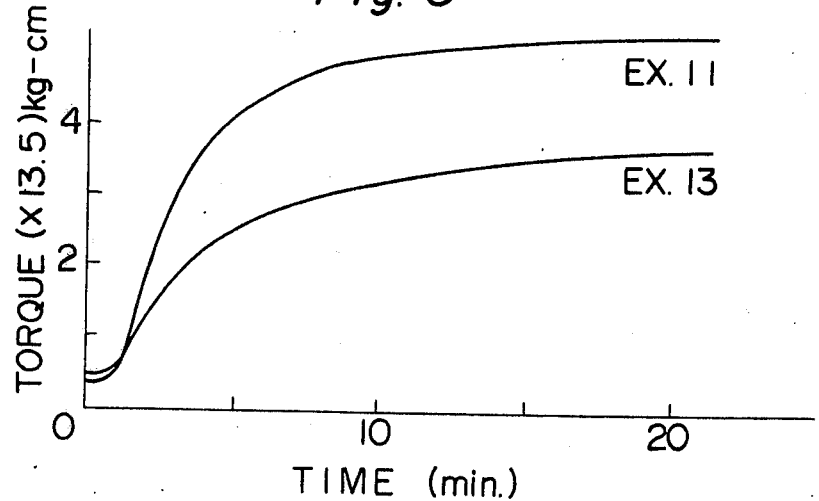

CURED OR UNCURED COMPOSITIONS OF HOMOPOLYMERS AND COPOLYMERS OF EPIHALOHYDRINS

This invention relates to cured or uncured compositions of homopolymers or copolymers of epihalohydrins having greatly improved properties.

More specifically, the invention relates to cured or uncured compositions of homopolymers or copolymers of epihalohydrins which demonstrate various improved properties such as the following: superior storage stability of the uncured composition, satisfactory vulcanizing speeds at which the uncured composition is cured, outstanding performance with respect to their property of preventing contamination and corrosion of a mold and other metallic vessels used in the curing operation, superior properties of the cured composition such as superior resistance to heat-aging and satisfactory compression set, and superior performance in preventing corrosion when the cured composition is used in contact with metals. Furthermore, it relates to a composition which is free from a cyclic carboxylic anhydride which because of its sublimable character often tends to cause troubles in an improved method previously suggested by some of the coinventors of the present application wherein a cyclic carboxylic acid anhydride and a salt of 1,8-diazabicyclo(5,4,0)undecene-7 are used, and which exhibits more satisfactory vulcanizing speeds in the curing of the uncured composition.

Some homopolymers or copolymers of epihalohydrins (hereinafter abbreviated often to epihalohydrin polymers), after being cured (vulcanized, i.e., crosslinked), are used commercially as a rubber material having desirable heat resistance and resistance to oils and various other unique properties. Various new proposals have been made in regard to the method of curing epihalohydrin polymers.

The cross-linking of the epihalohydrin polymer is believed to be the result of a reaction of the sidechain halogen contained in the molecule of the polymer, and a typical example of the curing method is disclosed in U.S. Pat. No. 3,026,305. The Patent suggests that the curing is accomplished by reacting sulfur or a certain class of organic sulfur compounds, such as tetramethylthiuram disulfide or 2-mercaptobenzothiazole, with the epihalohydrin polymer in the presence of a certain class of amines such as tri-n-butylamine, triethanolamine or dicyclohexylamine. As another suggestion, a method is known in which 2-mercaptoimidazoline or 2-mercaptopyrimidine and a specific metal compound such as red lead, magnesia, white lead or dibasic lead phosphite are used in combination (U.S. Pat. No. 3,341,491). Other curing methods are known in which a certain class of polyamine or a salt thereof such as ethylenediamine or hexamethylenediamine carbamate is used as a curing agent (U.S. Pat. No. 3,026,270), or in which a mercaptotriazine derivative such as 1-dibutylamino-3,5-dimercaptotriazine is used as a curing agent (Japanese Patent Publication No. 36926/73).

Notwithstanding these various prior art suggestions concerning the curing of epihalohydrin polymers, the epihalohydrin polymer technology has been unable so far to provide a cured or uncured epihalohydrin polymer composition which possesses various desirable properties such as satisfactory storage stability and vulcanization speeds, superior performance in preventing corrosion on metals, satisfactory heat resistance and compression set. This consequently has imposed numerous limitations on the utilization of epihalohydrin polymers which have excellent properties as a rubber material. It has been desired therefore to develop cured or uncured compositions of epihalohydrin homopolymers or copolymers possessing the foregoing properties to a satisfactory extent.

Some of the coinventors of the present application previously discovered that a satisfactory cured or uncured composition of a homopolymer or copolymer of an epihalohydrin can be prepared by using a combination of 1,8-diazabicyclo(5,4,0) undecen-7 (hereinafter abbreviated often to DBU) or a salt thereof and a cyclic carboxylic anhydride as a curing agent for epihalohydrin polymers, and a specific metal compound as an acid acceptor (U.S. patent application Ser. No. 550,998 filed Feb. 19, 1975, and corresponding Canadian Patent Application No. 220,411 filed Feb. 19, 1975).

It has now been found that the use of a cyclic carboxylic anhydride as an essential component in the composition disclosed in the above-mentioned prior application can be omitted when an acid salt of 1 mole of a polybasic carboxylic acid with 1 mole of DBU (to be sometimes abbreviated hereinbelow as an acid salt of a polybasic carboxylic acid with DBU), a cyanuric acid salt of DBU, or a mixture of a polybasic carboxylic acid and a neutral salt of DBU is used, and that as a result, the operational and economic disadvantages can be overcome and various advantages can be obtained such as better storage stability, faster vulcanization speeds, and the reduction in the amount of expensive DBU salts. It has also been found that a DBU salt of cyanuric acid, a polybasic carboxylic acid also induces a very smooth performance of the crosslinking of polyepihalohydrins.

It is an object of this invention therefore to provide a cured or uncured composition of a homopolymer or copolymer of an epihalohydrin having improved outstanding properties mentioned hereinabove, which cannot be achieved by conventional methods.

Other objects and advantages of the invention will become apparent from the following description.

According to this invention, there is provided a cured or uncured composition of a homopolymer or copolymer of an epihalohydrin comprising a homopolymer or copolymer of an epihalohydrin, a curing amount of a curing agent therefor and an acid acceptor and as an optional component, additives such as fillers, reinforcing agents, plasticizers, lubricants, tackifiers, stabilizers, antioxidants, foaming agents, flame retardants or pigments; characterized in that the curing agent and acid acceptor consist, based on 100 parts by weight of the epihalohydrin homopolymer or copolymer, of a. a component selected from the group consisting of 1 to 200 parts by weight, preferably about 1 to about 100 parts by weight of an acid salt of a polybasic carboxylic acid with 1,8-diazobicyclo(5,4,0)undecene-7, 1 to 10 parts by weight of a cyanuric acid salt of 1,8-diazabicyclo(5,4,0)undecene-7 and a mixture of 1 to 200 parts by weight, preferably about 1 to about 100 parts by weight, of a polybasic carboxylic acid and 1 to 10 parts by weight of a neutral salt of 1,8-diazabicyclo(5,4,0)undecene-7, and b. 1 to 20 parts by weight of a metal compound selected from the group consisting of oxides of metals of Group II of the periodic table of elements, hydroxides of the Group II metals, carbonates of the Group II metals, silicates of the Group II metals, phosphites of the Group II metals, carboxylic acid salts of the Group II metals, oxides of metals of Group IVa of the periodic table of elements, basic carbonates of the Group IVa metals, basic carboxylic acid salts of the Group IVa metals and basic phosphites of the Group IVa metals.

The composition of this invention does not contain a cyclic carboxylic acid anhydride.

The homopolymer or copolymer of an epihalohydrin of this invention contains a halo-methyl group as a functional group. Examples of these epihalohydrin polymers are homopolymers of epihalohydrins such as polyepichlorohydrin and polyepibromohydrin and epihalohydrin copolymers. The epihalohydrin copolymers include, for example, an epichlorohydrin/epibromohydrin copolymer and copolymers of epihalohydrins with at least one comonomer selected from the group consisting of epoxide compounds and dicarboxylic acid anhydrides. Examples of the epoxides include copolymerizable epoxides such as ethylene oxide, propylene oxide, butylene oxide, styrene oxide, phenylglycidyl ether, allylglycidyl ether and glycidyl methacrylate. On the other hand, examples of the dicarboxylic anhydrides are 5-membered dicarboxylic acid anhydrides such as succinic anhydride, phthalic anhydride, itaconic anhydride, hexahydrophthalic anhydride and tetrahydrophthalic anhydride. These comonomers may be used either alone or in a suitable combination of two or more.

Advantageously, the copolymer derived from the epihalohydrin and the comonomer is one consisting of at least about 5 mole %, preferably at least about 10 mole %, more preferably at least about 20 mole %, and still more preferably at least about 40 mole %, of the epihalohydrin and the remainder being the comonomer. Specific examples of such copolymers include an epichlorohydrin or epibromohydrin/ethylene oxide copolymer, an epichlorohydrin or epibromohydrin/allylglycidyl ether copolymer, an epichlorohydrin or epibromohydrin/ethylene oxide/allylglycidyl ether copolyer, an epichlorohydrin or epibromohydrin/propylene oxide/allyglycidyl ether copolymer, an epichlorohydrin or epibromohydrin/succinic anhydride copolymer, an epichlorohydrin or epibromohydrin/ethylene oxide/succinic anhydride copolymer, an epichlorohydrin or epibromohydrin/propylene oxide/succinic anhydride copolymer and an epichlorohydrin or epibromohydrin/ethylene oxide/propylene oxide copolymer.

The composition of this invention contains a component selected from the group consisting of an acid salt of a polybasic carboxylic acid with DBU, a cyanuric acid salt of DBU and a mixture of a polybasic carboxylic acid and a neutral salt of DBU.

DBU is a compound expressed by the following formula

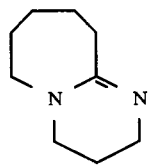

As the formula indicates, while DBU contains two nitrogen atoms in the molecule, it does not form di-salts with protonic acids and Lewis acids but forms only mono-salts. That is to say, DBU behaves as a monovalent base, and in this respect, differs from diamines which contain two nitrogen atoms in the molecule and behave as a divalent base. In addition, whilst the diamine curing agents used in the above-described prior art U.S. Pat. No. 3,026,270 demonstrate a cross-linking activity even when they are used alone with the epihalohydrin polymer, the DBU is unique in that it does not show any utilizable curing effect at all when used alone.

The carboxylic acid used in this invention to form the DBU salts or as the mixture is free from sulfur.

Examples of the polybasic carboxylic acid in the acid salt of polybasic carboxylic acid with 1,8-diazabicyclo(5,4,0)undecene-7 are aliphatic saturated dicarboxylic acids containing 2 to 10 carbon atoms such as oxalic acid, malonic acid, succinic acid, glutaric acid, adipic acid, pimelic acid, suberic acid, azelaic acid or sebacic acid; unsaturated dicarboxylic acids containing 4 to 6 carbon atoms such as maleic acid, fumaric acid, citraconic acid, isaconic acid, itaconic acid, glutaconic acid, or muconic acid; unsaturated tribasic carboxylic acids containing 6 carbon atoms such as tricarballylic acid or aconitic acid; hydroxypolycarboxylic acids such as malic acid, tartaric acid or citric acid; polycarbosylic acids containing an ether linkage such as diglycolic acid; polyadducts of unsaturated monocarboxylic acids such as acrylic acid or methacrylic acid; polyadducts containing an unsaturated carboxylic acid such as acrylic acid; methacrylic acid, maleic acid, fumaric acid or itaconic acid as a comonomer; carboxyl-terminated polycondensates formed between polyhydric alcohols and polycarboxylic acids; succinic acid derivatives resulting from the addition of maleic acid to unsaturated compounds such as rosin, olefins, cyclopentadiene, furan or anthracene, typified by dodecenylsuccinic acid, tetrahydrophthalic acid, methyltetrahydrophthalic acid or endomethylenetetrahydrophthalic acid; alicyclic polycarboxylic acids such as cyclohexanedicarboxylic acid; aromatic polycarboxylic acids such as ortho-phthalic acid, isophthalic acid, terephthalic acid, trimellitic acid, trimesic acid, pyromellitic acid or naphthalenedicarboxylic acid; and halogen-substituted, amino-substituted and hydroxy-substituted products of the carboxylic acids exemplified above. Of these, the aliphatic polycarboxylic acids containing 4 to 10 carbon atoms are especially preferred.

The neutral salt of 1,8-diazabicyclo(5,4,0)undecene-7 is preferably selected from carbonates of DBU, salts with phenolic substances, salts with carboxylic acids, salts with carbonic acid and salts with weakly acidic inorganic solid acids. All phenolic substances which contain a hydroxylsubstituted benzene ring in the molecule and can form salts with DBU can be used in this invention. Typical examples of the phenolic substances are phenol, cresols, ethylphenols, allylphenols, guaiacol, chlorophenols, resorcinol, bisphenol, bis-(4-hydroxyphenyl)methane, and bis(4-hydroxyphenyl)-2-propane.

Any compounds containing a carboxyl group in the molecule can be used to form neutral salts with DBU, and suitable species can be chosen from aliphatic, alicyclic and aromatic mono- and poly-carboxylic acids and heterocontaining or substituted carboxylic acids which all contain 1 to 20 carbon atoms. Typical examples include acetic acid, propionic acid, butyric acid, valeric acid, caproic acid, enanthoic acid, caprylic acid, lauric acid, myristic acid, stearic acid, methylcaproic acid, methylcaprylic acid, ethylcaproic acid, ethylcaprylic acid, acrylic acid, methacrylic acid, crotonic acid, oleic acid, cyclohexane-carboxylic acid, glycolic acid, latic acid, glycine, alanine, benzoic acid, toluene-carboxylic acid, cinnamic acid, aminobenzoic acid, hydroxybenzoic acid, chlorobenzoic acid, naphthalenecarboxylic acid, pyridinecarboxylic acid, succinic acid, fumaric acid, glutaric acid, adipic acid, sebacic acid, phthalic acid, trimellitic acid, tetrahydrophthalic acid, hexahydrophthalic acid, dodecenylsuccinic acid, tartaric acid, and diglycolic acid.

Examples of the polybasic carboxylic acid used as a mixture with a neutral salt of DBU are the same as those given hereinabove with regard to the formation of the acid salt.

Preferred oxides, hydroxides, carbonates, silicates, phosphites or carboxylic acid salts of the metals of Group II are compounds of the Group II metals such as Mg, Ca, Zn, Sr, Cd and Ba, and metal compounds of Mg, Ca, and Ba are frequently used. Specific examples of these Group II metal compounds include magnesium oxide (magnesia), calcium oxide (quicklime), calcium hydroxide (slaked lime), barium oxide, zinc oxide (zinc white), magnesium carbonate, barium carbonate, strontium carbonate, calcium carbonate, magnesium silicate, calcium silicate, magnesium phthalate, calcium phthalate, calcium stearate, magnesium stearate, barium stearate, calcium benzoate, magnesium benzoate, calcium oleate, calcium citrate, calcium phosphite, and magnesium phosphite. On the other hand, preferred oxides, basic carbonates, basic carboxylic acid salts and basic phosphites of the metals of Group IVa are compounds of the Group IVa metals selected from Si, Ge, Sn, and Pb, the Zn and Pb compounds being especially preferred. Specific examples of these compounds are triplubmic tetroxide (red lead), lead monoxide (litharge), stannic oxide, dibasic lead carbonate (white lead), dibasic lead phthalate, dibasic lead stearate and dibasic lead phosphite. These metal compounds, which are presumed to serve as acid acceptors, can be used either singly or in a combination of two or more. They may also be used in conjunction with other metal compounds that are known as acid acceptors.

In the present invention, the polybasic carboxylic acid of DBU is used in an amount of 1 to 200, preferably 1 to 100, parts by weight per 100 parts by weight of the homopolymer or copolymer of epihalohydrin. when the mixture of the polybasic carboxylic acid and the neutral salt of DBU is used, it consists of 1 to 200 parts by weight of the polybasic carboxylic acid and 1 to 10 parts by weight of the neutral salt of DBU per 100 parts by weight of the epihalohydrin homopolymer or copolymer.

Since the mixture of the polybasic carboxylic acid and the neutral salt of DBU exhibits a good cross-linking effect, the use of it has the advantage of being able to reduce the amount of DBU over the case of using only the neutral salt of DBU.

Various known additives can be incorporated in the composition of this invention. Typical examples of these additives are reinforcing agents or fillers such as carbon black, white carbon, calcium carbonate, magnesium carbonate, barium sulfate, clay, diatomaceous earth and phenolic resins, softeners or plasticizers such as esters of various carboxylic acids or phosphoric acid, polyethers and paraffinic or aromatic hydrocarbons, lubricants such as long-chain aliphatic carboxylic acids or long-chain aliphatic carboxylates, tackifiers such as alkylphenol-formaldehyde resins, cumarone resins, terpene resins and rosin, antioxidants such as phenol derivatives, amine derivatives, mercapto derivatives, dialkyl dithiocarbamates and phosphorous acid esters, stabilizers such as organotin compounds and epoxy compounds, flame retardants such as antimony oxide and phosphoric acid esters, and pigments such as titanium dioxide.

The amount in which these additives are added can be suitably varied as desired. Most frequently, they are used in an amount, per 100 parts by weight of epihalohydrin polymer, of usually, say, about 1 to 100 parts by weight in the case of the fillers or reinforcing agents and the plasticizers or softeners, 0.1 to 10 parts by weight in the case of the lubricants and tackifiers, and 0.1 to 10 parts by weight in the case of the antioxidants and stabilizers.

In the preparation of the uncured composition of this invention, the components (a) and (b) and other additives can be blended in any sequence with the epihalohydrin polymer. Furthermore, there is no particular restriction on the means and procedures to be used to perform blending, but any means and procedures can be used so long as they afford a homogeneous composition. For example, blending can be performed using open rolls or various types of blenders and mixers either in a single step or in a plurality of steps.

If desired, the composition of the invention can be blended with a polymer other than the epihalohydrin polymers. The amount of the other polymer is preferably not more than about 50% by weight, more preferably not more than about 30% by weight, and most preferably not more than about 20% by weight, based on the epihalohydrin polymer. The other polymer is best blended in such an amount that a unit derived from the epihalohydrin polymer accounts for at least about 30%, and preferably at least about 50%, of the resinous constituents of the entire composition. Specific examples of the other polymer are polychloroprene, polyvinyl chloride, chlorinated polyethylene, acrylic ester-chloroethylvinyl ether copolymers and epoxy resins.

The curing of the uncured composition of this invention can be accomplished by heating the composition. The heating temperature, which can be chosen suitably, is usually from about 120° C. to about 200° C. While the heating time is suitably chosen according to, say, the temperature and the amount of the cross-linking agent used, periods of from about 5 to about 60 minutes are most frequently used. The heat-curing need not be carried out in a single step but can be effected in many steps. For example, in order to achieve a still greater improvement of the physical properties of the cured composition, it can be subjected to a postcure treatment. The curing procedure may be any of the conventional procedures including, for example, pressurized heat-molding by means of molds, or heating by means of a steam kettle, oil bath, sand bath, air bath, etc.

The following Examples illustrate several modes of the compositions of this invention and their properties in greater detail.

EXAMPLES 1 to 14

An epichlorohydrin homopolymer (CHR) and an epichlorohydrin/ethylene oxide copolymer (CHC) were each used, and uncured compositions of CHR and of CHC having the formulations shown in Table 1 were prepared. These uncured compositions were each kneaded for 15 minutes on mixing rolls at 70° C. and formed into a sheet. The resulting uncured compositions were placed in molds and cured under the application of pressure (80 Kg/cm$^2$) and heat (165° C) for 20 minutes to obtain cured compositions whose properties are shown in Table 2. and 9 at 155° C. FIG. 3 shows the cure curves of the cured compositions of Examples 11 and 13.

Table 1

| Examples | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CHR *1 | 100 | 100 | 100 | 100 | | | | | | | 80 | 50 | | |
| CHC *2 | | | | | 100 | 100 | 100 | 100 | 100 | 100 | | | 100 | 100 |
| Dioctyl tin stearate | 1 | 1 | 1 | 1 | 1 | 1 | 1 | 0.5 | 0.5 | 0.5 | 1 | 1 | 1.0 | 1.0 |
| FEF carbon *3 | 40 | 40 | 40 | | 40 | 40 | 40 | 40 | 40 | | 40 | 40 | 40 | 40 |
| Clay *4 | | | | 60 | | | | | | 60 | | | | |
| Calcium carbonate | 8 | | | | | | | | | | | | | |
| Calcium silicate | | 8 | | | | | | | | | | | | |
| Calcium phosphite | | | 8 | | | | | | | | | | | |
| Magnesia | | | | | | | | | | | | | 5 | |
| Red lead | | | | | 5 | 5 | 5 | 5 | 5 | | 5 | 5 | | 5 |
| White lead | | | | 5 | | | | | | 5 | | | | |
| Succinic acid | 2 | | | | | | | | | | | | | |
| Itaconic acid | | 2.5 | | | | | | | | | | | | |
| Glutaric acid | | | 2.5 | | | | | | | | | | | |
| Adipic acid | | | | | | | | | | 3 | | | | |
| Sebacic acid | | | | | 4 | 4 | | | | | | | | |
| Carboxylated NBR *5 | | | | | | | | | | | 20 | 50 | | |
| DBU | 2 | | | | | | | | | | | | | |
| DBU-2-ethylhexane acid salt *6 | | | 4 | | | 4 | | | | | 4 | 3 | 3 | |
| DBU-phenol salt *7 | | | 4 | | | | 3 | | | | | | | |
| DBU-succinic acid salt *8 | | | | | | | | 4.4 | | | | | | |
| DBU sebacic acid salt *9 | | | | 6 | | | | | 6 | | | | | |
| DBU sebacic acid salt *10 | | | | | | | | | | 5 | | | | |
| DBU salt of cyanuric acid *11 | | | | | | | | | | | | | 3 | 3 |

*1: epichlorohydrin homopolymer rubber (a product of Osaka Soda);
*2: epichlorohydrin/ethylene oxide copolymer rubber (a product of Osaka Soda);
*3: Seast 116 (a product of Tokai Denkyoku Company);
*4: Burgess Iceberg (Burgess Pigment Co.)
*5: Krynac 221 (Polysar Ltd.)
*6: U Cat. 102 (San-Abbot Company);
*7: U Cat. SA No. 1 (San-Abbott Company);
*8: Succinic acid/DBU = 2.3/2.1 (weight ratio);
*9: sebacic acid/DBU = 1.9 (weight ratio);
*10: sebacic acid/DBU = 0.67 (weight ratio).
*11: Mono-DBU salt Table 2

| Examples | 1 | 2 | 3 | 4 | 5 | 6 | 7 | 8 | 9 | 10 | 11*2 | 12*2 | 13 | 14*2 |
|---|---|---|---|---|---|---|---|---|---|---|---|---|---|---|
| 100% modulus (Kg/cm$^2$) | 18 | 31 | 20 | 32 | 19 | 38 | 23 | 39 | 41 | 19 | 61 | 65 | 30 | 53 |
| 200% modulus (Kg/cm$^2$) | 36 | 56 | 38 | 61 | 36 | 75 | 54 | 78 | 78 | 34 | 118 | 143 | 44 | 81 |
| Tensile strength (Kg/cm$^2$) | 71 | 98 | 77 | 110 | 107 | 119 | 116 | 112 | 118 | 103 | 158 | 185 | 108 | 115 |
| Elongation at break (%) | 770 | 500 | 750 | 340 | 805 | 405 | 590 | 385 | 415 | 780 | 325 | 280 | 235 | 250 |
| Shore hardness A | 64 | 70 | 64 | 74 | 65 | 74 | 69 | 75 | 74 | 66 | 76 | 76 | 78 | 75 |
| Curing at 155° C. × 30' + Postcuring at 150° C. × 5 hrs. | | | | | | | | | | | | | | |
| 100% modulus (Kg/cm$^2$) | 30 | 44 | 32 | 51 | 35 | 58 | 38 | 60 | 53 | 31 | 100 | 126 | — | — |
| 200% modulus (Kg/cm$^2$) | 55 | 80 | 60 | 97 | 67 | 110 | 78 | 114 | 106 | 62 | — | — | — | — |
| Tensile strength (Kg/cm$^2$) | 85 | 102 | 90 | 108 | 116 | 135 | 109 | 132 | 133 | 109 | 170 | 164 | — | — |
| Elongation at break (%) | 420 | 290 | 380 | 290 | 420 | 290 | 375 | 275 | 285 | 440 | 175 | 128 | — | — |
| Shore hardness A | 73 | 80 | 74 | 78 | 74 | 79 | 73 | 80 | 79 | 72 | 81 | 81 | — | — |
| Lupke rebound (%) | — | — | — | — | 38 | — | — | 45 | — | — | 34 | 36 | — | — |
| Compression set (%) *1 | — | — | — | — | 27 | — | — | 24.5 | — | — | 22 | 30 | — | — |

Note:
*1: The compression set was measured at 120° C. for 70 hours.
*2: Cured at 155° C × 45'.

Table 3

| | | 150° C × 3 days | 150° C × 7 days | 150° C × 14 days | 150° C × 21 days |
|---|---|---|---|---|---|
| Example 5 | 100% modulus (Kg/cm$^2$) | 66 | 90 | 77 | 61 |
| | Tensile strength (Kg/cm$^2$) | 124 | 115 | 82 | 70 |
| | Elongation at break (%) | 250 | 170 | 120 | 125 |
| | Shore hardness A | 79 | 82 | 82 | 81 |
| Example 8 | 100% modulus (Kg/cm$^2$) | 78 | 95 | 78 | 65 |
| | Tensile strength (Kg/cm$^2$) | 125 | 110 | 86 | 74 |
| | Elongation at break (%) | 195 | 145 | 125 | 125 |
| | Shore hardness A | 83 | 84 | 84 | 83 |

The results of a heat-aging test performed in Examples 5 and 8 are shown in Table 3. In these Examples, there was scarcely any appreciable change in the hardness of the cured compositions. The cure curves of the cured compositions in Examples 5 and 6 are shown in FIG. 1. The measurement of the cure curves was performed by means of a curelastometer (Model JSR) at 165° C. with an amplitude angle of 3°. FIG. 2 shows the cure curves of the cured compositions of Examples 7, 8

What we claim is:
1. In a cured or uncured composition consisting essentially of:
I. a polymer which is
A. an epihalohydrin homopolymer, or
B. an epihalohydrin copolymer consisting essentially of:

1. at least 5 mol% of an epihalohydrin monomer; and
2. the remainder being at least one monomer selected from the group consisting of an epihalohydrin other than (1), copolymerizable epoxides other than epihalohydrin, and 5-membered dicarboxylic acid anhydrides;

II. a second polymer blended with polymer I present in 0% to 50% by weight, based on the weight of polymer I, and being selected from at least one member of the group consisting of polychloroprene, polyvinyl chloride, chlorinated polyethylene and acrylic ester-chloroethylvinyl ether copolymer; and III. a curing amount of a 1,8-diazabicyclo(5,4,0(undecene-7 containing curing agent and a metal compound acid acceptor;

the improvement wherein component III comprises, on a basis of 100 parts by weight, of polymer I:

A. a curing agent consisting of a curing agent which is free from cyclic carboxylic acid anhydride and which is a member selected from the group consisting of
1. from about 1 to 200 parts by weight of an acid salt of (i) 1 mole of polycarboxylic acid with (ii) 1 mole of 1,8-diazabicyclo(5,4,0)undecene-7;
2. 1 to 10 parts by weight of a cyanuric acid salt of 1,8-diazabicyclo(5,4,0)undecene-7; and
3. a mixture of (i) 1 to 200 parts by weight of a polybasic carboxylic acid and (ii) 1 to 10 parts by weight of a neutral salt of 1,8-diazabicyclo(5,4,0)undecene-7; and B. an acid acceptor comprising from about 1 to 20 parts by weight of at least one metal compound selected from the group consisting of: the oxide, hydroxide, carbonate, silicate, phosphate and carboxylic acid salt of a metal of Group II of the Periodic Table of elements; or the oxide, basic carbonate, basic carboxylic acid salt and basic phosphite of a metal of Group IV-A of the Periodic Table of elements.

2. The composition of claim 1 in which the curing agent is component III(A)(3) wherein the neutral salt of 1,8-diazabicyclo(5,4,0)undecene-7 III(A)(3)(ii) is a salt of the 1,8-diazabicyclo(5,4,0(undecene-7 and a compound selected from the group consisting of phenol, salt-forming derivatives of phenol, carboxylic acids, carbonic acid and weakly acidic inorganic solid acids.

3. The composition of claim 1 wherein the metals of Group II of metal compound III(B) are metals selected from the group consisting of Mg, Ca, Zn and Ba, and the metals of Group IVb of metal compound III(B) are metals selected from the group consisting of Sn and Pb.

4. The composition of claim 1 in which the curing agent is component III(A)(1).

5. The composition of claim 4 in which component III(A)(1) consists of about 1 to about 100 parts by weight of said acid salt per 100 parts by weight of polymer I.

6. The composition of claim 5 in which the polybasic carboxylic acid III(A)(1)(i) is free from sulfur and is selected from the group consisting of
a. aliphatic saturated acids containing 2 to 10 carbon atoms;
b. unsaturated dicarboxylic acids containing 4 to 6 carbon atoms;
c. unsaturated tribasic carboxylic acids containing 6 carbon atoms;
d. hydroxypolycarboxylic acids;
e. polycarboxylic acids containing an ether linkage;
f. carboxyl-terminated polycondensates formed between polyhydric alcohols and polycarboxylic acids;
g. succinic acid derivatives resulting from the addition of maleic acid to an an unsaturated compound selected from the group consisting of rosin; olefin, cyclopentadiene, furan and anthracene;
h. alicyclic polycarboxylic acids; and
i. aromatic polycarboxylic acid; or
j. halogen-substituted, amino-substituted or hydroxy-substituted products of any of the polybasic carboxylic acids (a)-(i).

7. The composition of claim 5 in which the polybasic carboxylic acid III(A)(1)(i) is selected from the group consisting of aliphatic carboxylic acid containing 4 to 10 carbon atoms.

8. The composition of claim 7 in which the aliphatic carboxylic acid containing 4 to 10 carbon atoms is a saturated acid selected from the group consisting of succinic acid, glutaric acid, adipic acid, pimelic acid, suberic acid, azelaic acid and sebacic acid or an unsaturated acid selected from the group consisting of maleic acid, fumaric acid, citraconic acid, isaconic acid, itaconic acid, glutaconic acid and muconic acid.

9. The composition of claim 1 in which the curing agent is component III(A)(2) cyanuric acid salt of 1,8-diazabicyclo(5,4,0)undecene-7.

10. The composition of claim 2 wherein said neutral salt of III(A)(3)(ii) is a salt of 1,8-diazabicyclo(5,4,0(undecene-7 and a phenolic substance selected from a group consisting of phenol, cresol, ethylphenol, allylphenol, guaiacol, chlorophenol, resorcinol, bisphenol, bis-(4-hydroxyphenyl)methane and bis-(4-hydroxyphenyl)-2-propane.

11. The composition of claim 2 wherein said neutral salt III(A)(3)(ii) is a salt of 1,8-diazabicyclo(5,4,0)undecene-7 and a carboxylic acid selected from the group consisting of acetic acid, propionic acid, butyric acid, valeric acid, caproic acid, enanthoic acid, caprylic acid, lauric acid, myristic acid, stearic acid, methylcaproic acid, methylcaprylic acid, ethylcaproic acid, ethylcaprylic acid, acrylic acid, methacrylic acid, crotonic acid, oleic acid, cyclohexane-carboxylic acid, glycolic acid, lactic acid, glycine, alanine, benzoic acid, toulene-carboxylic acid, cinnamic acid, aminobenzoic acid, hydroxybenzoic acid, chlorobenzoic acid, naphthalenecarboxylic acid, pyridinecarboxylic acid, succinic acid, fumaric acid, glutaric acid, adipic acid, sebacic acid, phthalic acid, trimellitic acid, tetrahydrophthalic acid, hexahydrophthalic acid, dodecenylsuccinic acid, tartaric acid and diglycolic acid.

12. The composition of claim 2 wherein said polybasic carboxylic acid III(A)(3)(i) is free from sulfur and is a member selected from the group consisting of
a. aliphatic saturated acids containing 2 to 10 carbon atoms;
b. unsaturated dicarboxylic acids containing 4 to 6 carbon atoms;
c. unsaturated tribasic carboxylic acids containing 6 carbon atoms;
d. hydroxypolycarboxylic acids;
e. polycarboxylic acids containing an ether linkage;

f. carboxyl-terminated polycondensates formed between polyhydric alcohols and polycarboxylic acids;
g. succinic acid derivatives resulting from the addition of maleic acid to an unsaturated compound selected from the group consisting of rosin, olefin, cyclopentadiene, furan and anthracene;
h. alicyclic polycarboxylic acid; and
i. aromatic polycarboxylic acid; or
j. halogen-substituted, amino-substituted or hydroxy-substituted products of any of the polybasic carboxylic acids (a)-(i).

13. The composition of claim 2 which polycarboxylic acid III(A)(3)(i) is from about 1 to about 100 parts by weight.

14. The composition of claim 3 wherein metal compound III(B) is at least one member selected from the group consisting of magnesium oxide (magnesia), calcium oxide (quicklime), calcium hydroxide (slaked lime), barium oxide, zinc oxide (zinc white), magnesium carbonate, barium carbonate, strontium carbonate, calcium carbonate, magnesium silicate, calcium silicate, magnesium phthalate, calciumphthalate, calcium stearate, magnesium benzoate, calcium oleate, calcium citrate, calcium phosphite, magnesium phosphite, triplubmic tetroxice (red lead), lead monoxide (litharge), stannic oxide, dibasic lead carbonate (white lead), dibasic lead phthalate, dibasic lead stearate and dibasic lead phosphite.

15. The composition of claim 1 which is cured.

16. The composition of claim 2 which is cured.

17. The composition of claim 2 in which the curing agent III(A)(3) is a mixture of itaconic acid, sebacic acid or adipic acid and 2-ethylhexane acid salt of 1,8-diazabicyclo(5,4,0)undecene-7.

18. The composition of claim 16 in which the curing agent III(A)(3) is a mixture of sebacic acid and 2-ethylhexane acid salt of 1,8-diazabicyclo(5,4,0)undecene-7.

19. The composition of claim 4 in which component III(A)(i) is succinic acid salt or sebacic salt of 1,8-diazabicyclo(5,4,0)undecene-7.

20. The composition of claim 19 in which the curing agent III(A)(1) is sebacic acid salt of 1,8-diazabicyclo(5,4,0)undecene-7.

21. The composition of claim 20 which is cured.

* * * * *